(12) United States Patent
De Jong et al.

(10) Patent No.: US 8,295,247 B2
(45) Date of Patent: *Oct. 23, 2012

(54) ACCESS STRATUM MANAGER

(75) Inventors: Gjalt Gerrit De Jong, Leuven (BE);
Gerald D. Kelliher, London (GB);
Robert J. Harrison, Birmingham (GB)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,501

(22) Filed: Dec. 27, 2011

(65) Prior Publication Data

US 2012/0122517 A1    May 17, 2012

Related U.S. Application Data

(63) Continuation of application No. 13/176,561, filed on Jul. 5, 2011, now Pat. No. 8,107,437, which is a continuation of application No. 12/566,082, filed on Sep. 24, 2009, now Pat. No. 7,986,671, which is a continuation of application No. 11/766,949, filed on Jun. 22, 2007, now Pat. No. 7,596,121, which is a continuation of application No. 10/678,796, filed on Oct. 3, 2003, now Pat. No. 7,251,227.

(60) Provisional application No. 60/416,154, filed on Oct. 4, 2002, provisional application No. 60/416,864, filed on Oct. 8, 2002.

(51) Int. Cl.
*H04W 4/00*    (2009.01)

(52) U.S. Cl. .......... 370/331; 455/437; 455/522.1
(58) Field of Classification Search .......... 370/328, 370/331, 332; 455/436, 437, 550.1, 552.1, 455/553.1
See application file for complete search history.

(56) References Cited

U.S. PATENT DOCUMENTS

| | | | |
|---|---|---|---|
| 6,542,516 B1 | 4/2003 | Vialen et al. |
| 6,785,535 B2 | 8/2004 | Lucidarme et al. |
| 7,251,227 B2 | 7/2007 | De Jong et al. |
| 7,596,121 B2 | 9/2009 | De Jong et al. |
| 7,986,671 B2 | 7/2011 | De Jong et al. |
| 2003/0129971 A1 | 7/2003 | Gopikanth |
| 2005/0169205 A1 | 8/2005 | Grilli et al. |
| 2005/0239453 A1 | 10/2005 | Vikberg et al. |

*Primary Examiner* — Nguyen Vo

(57) ABSTRACT

A multi-mode mobile communication device includes a processing device, a memory sub-system, a communication sub-system operable to communicate with wireless access networks, and a protocol stack stored in the memory sub-system and executed by the processing device. The protocol stack includes a first access stratum, a second access stratum, a non-access stratum and an access stratum manager. The first access stratum communicates with a first wireless access network via the communication sub-system. The second access stratum communicates with a second wireless access network via the communication sub-system. The non-access stratum communicates with a core network. The access stratum manager interfaces the non-access stratum with the first and second access strata, and is operable to activate the first access stratum to establish a communication link with the core network over the first wireless access network.

20 Claims, 15 Drawing Sheets

ACCESS STRATUM MANAGER

CROSS-REFERENCE TO RELATED APPLICATIONS

This application is a Continuation of U.S. application Ser. No. 13/176,561, filed on Jul. 5, 2011, which is a Continuation of U.S. application Ser. No. 12/566,082, filed on Sep. 24, 2009, now U.S. Pat. No. 7,986,671, which is a Continuation of U.S. application Ser. No. 11/766,949, filed on Jun. 22, 2007, now U.S. Pat. No. 7,596,121, which is a Continuation of U.S. application Ser. No. 10/678,796, filed on Oct. 3, 2003, now U.S. Pat. No. 7,251,227, which claims priority from and is related to the following prior applications: "Radio Access Technology Manager," U.S. Provisional Application No. 60/416,154, filed on Oct. 4, 2002 and "Radio Access Technology Manager," U.S. Provisional Application No. 60/416,864, filed on Oct. 8, 2002. These prior applications, including the entire written descriptions and drawing figures, are hereby incorporated into the present application by reference.

FIELD

The technology described in this patent document relates generally to the field of mobile communication systems. More particularly, the patent document describes an access stratum manager for use in a mobile communication device.

BACKGROUND

UMTS (Universal Mobile Telecommunications System) is a third generation public land mobile telecommunication system. Various standardization bodies publish standards for UMTS, each in their respective areas of competence. For instance, the 3GPP (Third Generation Partnership Project) publishes standards for GSM (Global System for Mobile Communications) and W-CDMA (Wideband Code Division Multiple Access) based UMTS, and the 3GPP2 (Third Generation Partnership Project 2) publishes standards for CDMA2000 (Code Division Multiple Access) based UMTS. Standard document 3GPP TS 22.129 addresses UMTS handover requirements between UTRAN (UMTS Terrestrial Access Network) and other radio systems, and is incorporated herein by reference.

SUMMARY

A multi-mode mobile communication device may include a processing device, a memory sub-system, a communication sub-system operable to communicate with the plurality of wireless access networks, and a protocol stack stored in the memory sub-system and executed by the processing device. The protocol stack may include a first access stratum, a second access stratum, a non-access stratum and an access stratum manager. The first access stratum may communicate with a first wireless access network via the communication sub-system. The second access stratum may communicate with a second wireless access network via the communication sub-system. The non-access stratum may communicate with a core network. The access stratum manager may interface the non-access stratum with the first and second access strata, and may be operable to activate the first access stratum to establish a communication link with the core network over the first wireless access network. The access stratum manager may be further operable to maintain the communication link between the non-access stratum and the core network while transferring control of the communication link from the first access stratum to the second access stratum. The multi-mode mobile communication device may measure the respective signal strengths of the first wireless access network and the second wireless access network, and the access stratum manager may initiate the transfer of control of the communication link from the first access stratum to the second access stratum in response to a handover control signal generated by first access stratum in response to the measured signal strengths.

DETAILED DESCRIPTION

Figure 1:
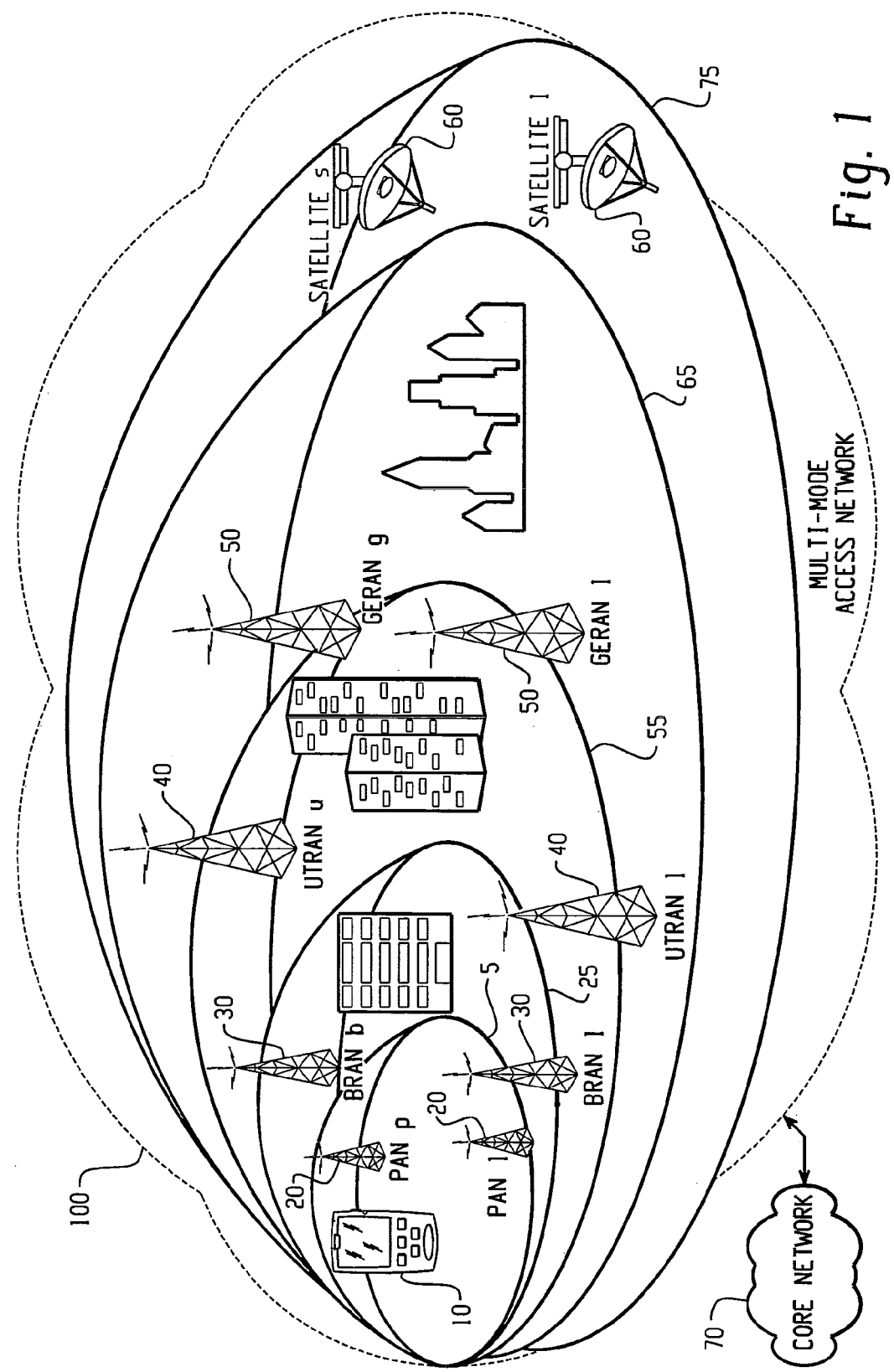
FIG. 1 is a block diagram of an example multi-mode access network (MMAN)

With reference now to the drawing figures, FIG. 1 is a block diagram of an example multi-mode access network (MMAN) 100. The MMAN 100 includes multiple zones 5, 25, 55, 65 and 75, within which a multi-mode mobile communication device 10 may communicate with multiple access networks 20, 30, 40, 50 and 60. The zones may include a personal zone 5, a pico zone 25, a micro zone 55, a macro zone 65, and a global zone 75. The access networks may include a plurality of personal access networks (PAN1-PANp) 20, a plurality of broadband radio access networks (BRAN1-BRANb) 30, a plurality of UTRANs (UTRAN1-UTRANu) 40, a plurality of GSM EDGE (Enhanced Data-rates for Global Evolution) Radio Access Networks (GERAN1-GERANg), and a plurality of satellite networks (Satellite 1-Satellite s). Also illustrated is a core network 70, which may be accessed by the multi-mode mobile communication device 10 via the MMAN 100. It should be understood that the zones 5, 25, 55, 65 and 75 illustrated in FIG. 1 are scaled relative to one another to show that access networks in a particular zone, such as the plurality of UTRANs 40 and GERANs 50, may provide network access to the multi-mode mobile communication device 10 within any zone smaller than the macro zone 65.

The personal access networks (PAN1-PANp) 20 may, for example, include short-range communication networks, such as BlueTooth™, infrared, or a wired access network, such as a local area network (LAN). The broadband radio access networks (BRAN1-BRANb) 30 may utilize medium-range communications, such as IEEE 802.11 communication systems.

The multi-mode mobile communication device 10 is operable to handover communications from one access network to another. That is, when the multi-mode mobile communication device 10 moves within a zone or from one zone to an adjacent zone, the multi-mode mobile communication device 10 may change mode to access alternate networks. For example, as the multi-mode mobile communication device 10 moves from a rural area in global zone 75, moves through a sub-urban area in a macro-zone 65, moves through a more densely populated urban area in micro-zone 55, enters a building in pico zone 25, and finally enters an office in personal zone 5, the multi-mode mobile communication device 10 attempts to access multiple networks using different modes, such as satellites 60, GERANs 50 and UTRANs 40, BRANs 30 and PANs 20, respectively. A more-detailed description of the multi-mode mobile communication device 10 is provided below.

Figure 2:
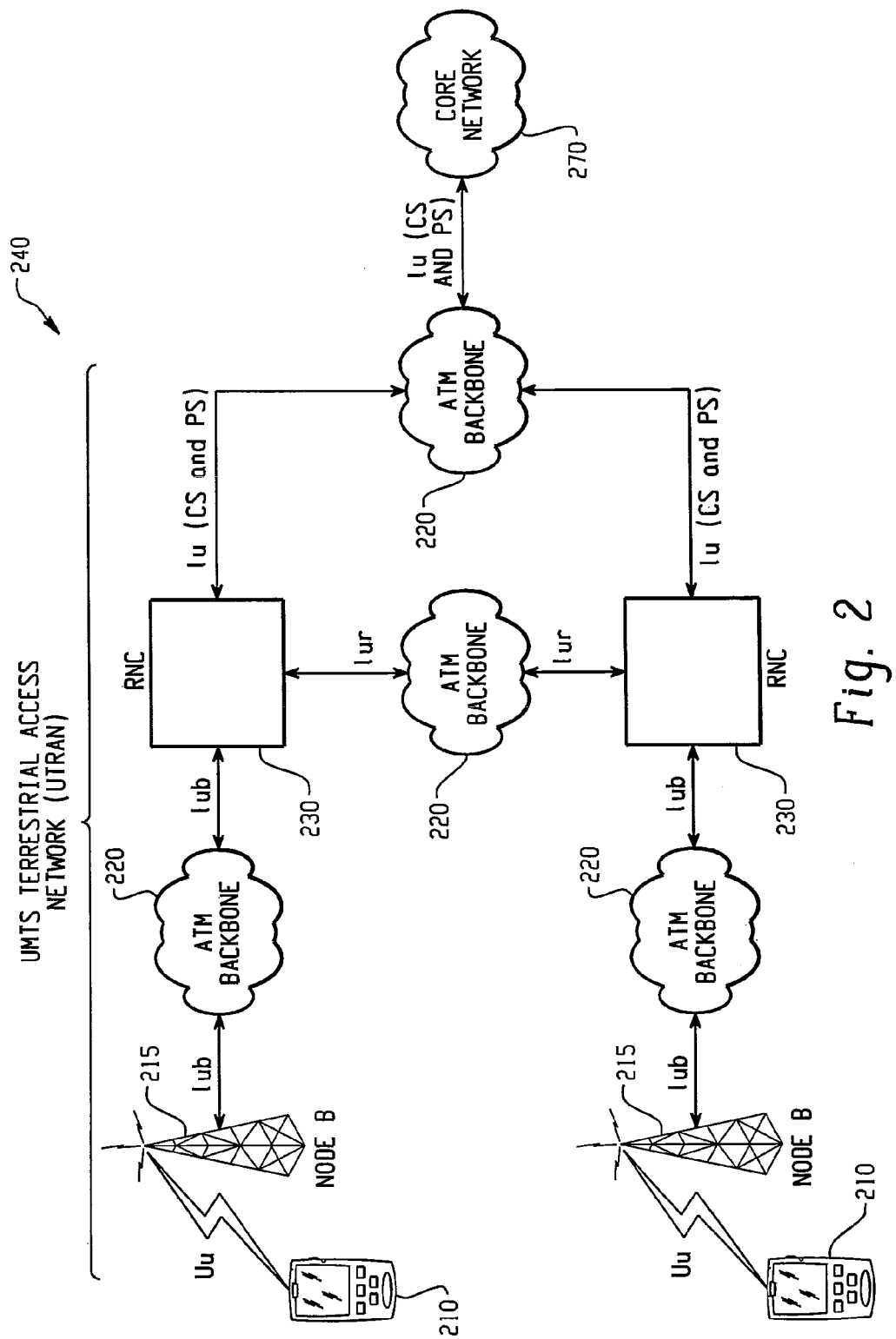
FIG. 2 is a block diagram illustrating a typical UTRAN.

FIG. 2 is a block diagram illustrating a typical UTRAN 240. Also illustrated is a multi-mode mobile communication device 210 that communicates with a core network 270 via the UTRAN 240. The UTRAN 240 includes multiple Node B's 215, of which only two are illustrated, to communicate wirelessly using radio waves over the Uu interface with the multi-mode mobile communication device 210. Depending on the capabilities of a particular UTRAN 240, an RNC 230 may support multiple Node B's of the same mode or multiple Node B's operating in diverse modes. An ATM (Asynchronous Transfer Mode) backbone 220 couples the various UTRAN 240 components together, and couples the UTRAN 240 to the core network 270.

Figure 3:
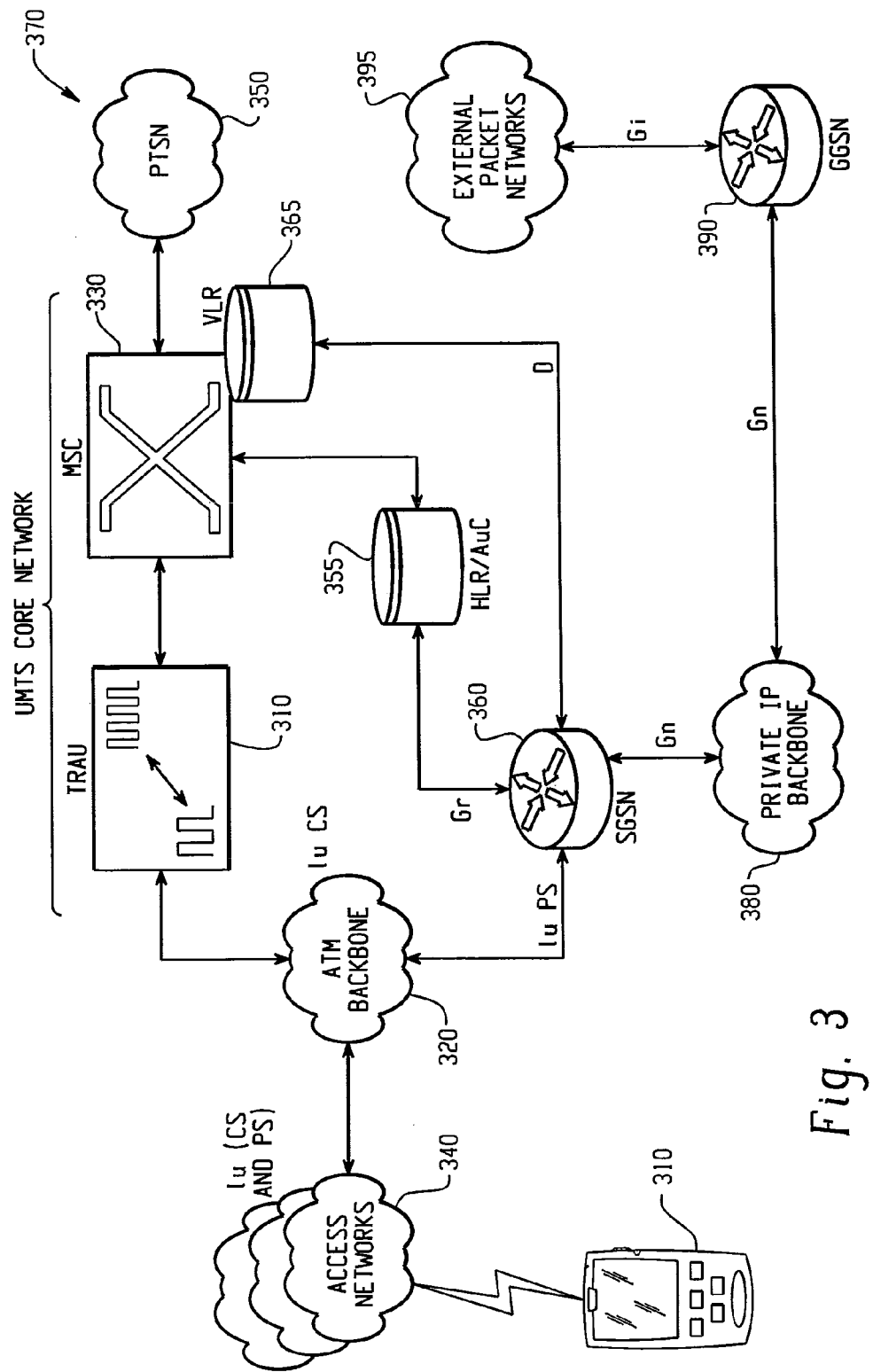
FIG. 3 is a block diagram of a typical core network.

FIG. 3 is a block diagram of a typical core network 370. Also illustrated is a multi-mode mobile communication device 310, which co-operates with one or more access networks 340 to communicate with the UMTS core network 370 via an ATM backbone 320. In operation, circuit switched (CS) packets may be sent and received via a transcoder/rate adapter unit (TRAU) 310, which converts UMTS speech packets to standard packets for a mobile switching center (MSC) 330 in order to communicate speech over a public switched telephone network (PSTN) 350. In addition, packet switched (PS) packets may be sent and received via a serving GPRS (General Packet Radio Service) support node (SGSN) 360, private IP backbone 380, Gateway GPRS Support Node (GGSN) 390, and external packet network 395.

Also included in the core network 370 are a visitor location register (VLR) 365 and a home location register/authentication center (HLR/AuC) 355. The VLR 365 stores the multi-mode mobile communication device 310 information required for call handling and other functions within an associated service area. The HLR/AuC 355 stores permanent records used to identify the multi-mode mobile communication device 310, and may also store temporary records, such as SGSN and VLR addresses.

Figure 4:
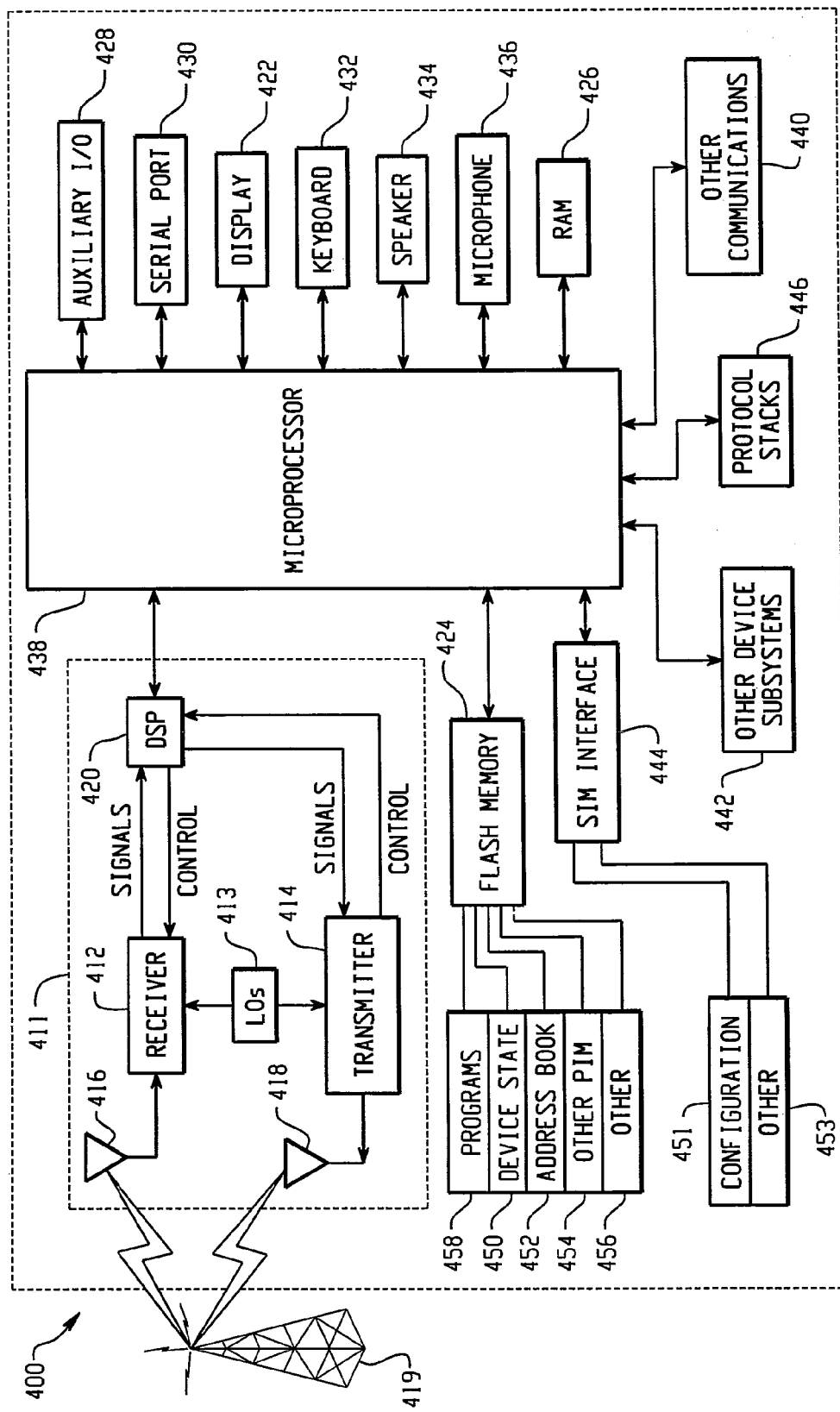
FIG. 4 is a block diagram illustrating an example mobile communication device.

FIG. 4 is a block diagram illustrating an example mobile communication device 400. The mobile communication device 400 includes a processing device 438, a communications subsystem 411, a short-range communications subsystem 440, input/output devices 422, 428, 430, 432, 434, 436, memory devices 424, 426, and various other device subsystems 442. The mobile communication device 400 is preferably a two-way communication device having voice and data communication capabilities. In addition, the device 400 preferably has the capability to communicate with other computer systems via the Internet.

The processing device 438 controls the overall operation of the mobile communication device 400. Operating system software executed by the processing device 438 is preferably stored in a persistent store, such as a flash memory 424, but may also be stored in other types of memory devices, such as a read only memory (ROM) or similar storage element. In addition, system software, specific device applications, or parts thereof, may be temporarily loaded into a volatile store, such as a random access memory (RAM) 426. Communication signals received by the mobile communication device 400 may also be stored to RAM 426.

The processing device 438, in addition to its operating system functions, enables execution of software applications 458, 450, 452, 454, 456 on the device 400. A predetermined set of applications that control basic device operations, such as data and voice communications, may be installed on the device 400 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 419. Preferably, the PIM data items are seamlessly integrated, synchronized and updated via the wireless network 419 with the device user's corresponding data items stored or associated with a host computer system.

Communication functions, including data and voice communications, are performed through the communication subsystem 411, and possibly through the short-range communications subsystem 440. The communication subsystem 411 includes a receiver 412, a transmitter 414 and one or more antennas 416, 418. In addition, the communication subsystem 411 also includes a processing module, such as a digital signal processor (DSP) 420 or other processing device (s), and local oscillators (LOs) 413. The specific design and implementation of the communication subsystem 411 is dependent upon the communication network in which the mobile communication device 400 is intended to operate. For example, a mobile communication device 400 may include a communication subsystem 411 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile communication devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile communication device 400 may send and receive communication signals over the communication network 419. Signals received by the antenna 416 from the communication network 419 are routed to the receiver 412, which provides for signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 419 are processed (e.g., modulated and encoded) by the DSP 420 and are then provided to the transmitter 414 for digital to analog conversion, frequency up conversion, filtering, amplification and transmission to the communication network 419 (or networks) via the antenna 418.

In addition to processing communication signals, the DSP 420 provides for receiver 412 and transmitter 414 control. For example, gains applied to communication signals in the receiver 412 and transmitter 414 may be adaptively controlled through automatic gain control algorithms implemented in the DSP 420.

In a data communication mode, a received signal, such as a text message or web page download, is processed by the communication subsystem 411 and input to the processing device 438. The received signal is then further processed by the processing device 438 for output to a display 422, or alternatively to some other auxiliary I/O device 428. A device user may also compose data items, such as e-mail messages, using a keyboard 438 and/or some other auxiliary I/O device 428, such as a touchpad, a rocker switch, a thumb-wheel, or some other type of input device. The composed data items may then be transmitted over the communication network 419 via the communication subsystem 411.

In a voice communication mode, overall operation of the device is substantially similar to the data communication mode, except that received signals are output to a speaker 434, and signals for transmission are generated by a microphone 436. Alternative voice or audio I/O subsystems, such as a voice message recording subsystem, may also be implemented on the device 400. In addition, the display 422 may also be utilized in voice communication mode, for example to display the identity of a calling party, the duration of a voice call, or other voice call related information.

The short-range communications subsystem 440 enables communication between the mobile communication device 400 and other proximate systems or devices, which need not necessarily be similar devices. For example, the short-range communications subsystem 440 may include an infrared device and associated circuits and components, or a Bluetooth™ communication module to provide for communication with similarly-enabled systems and devices.

In addition, if the mobile communication device is a multi-mode mobile communication device, as described herein, then protocol stacks 446, including an access stratum manager, may be included. The multi-mode protocol stacks and the access stratum manager are described in more detail below.

Figure 5:
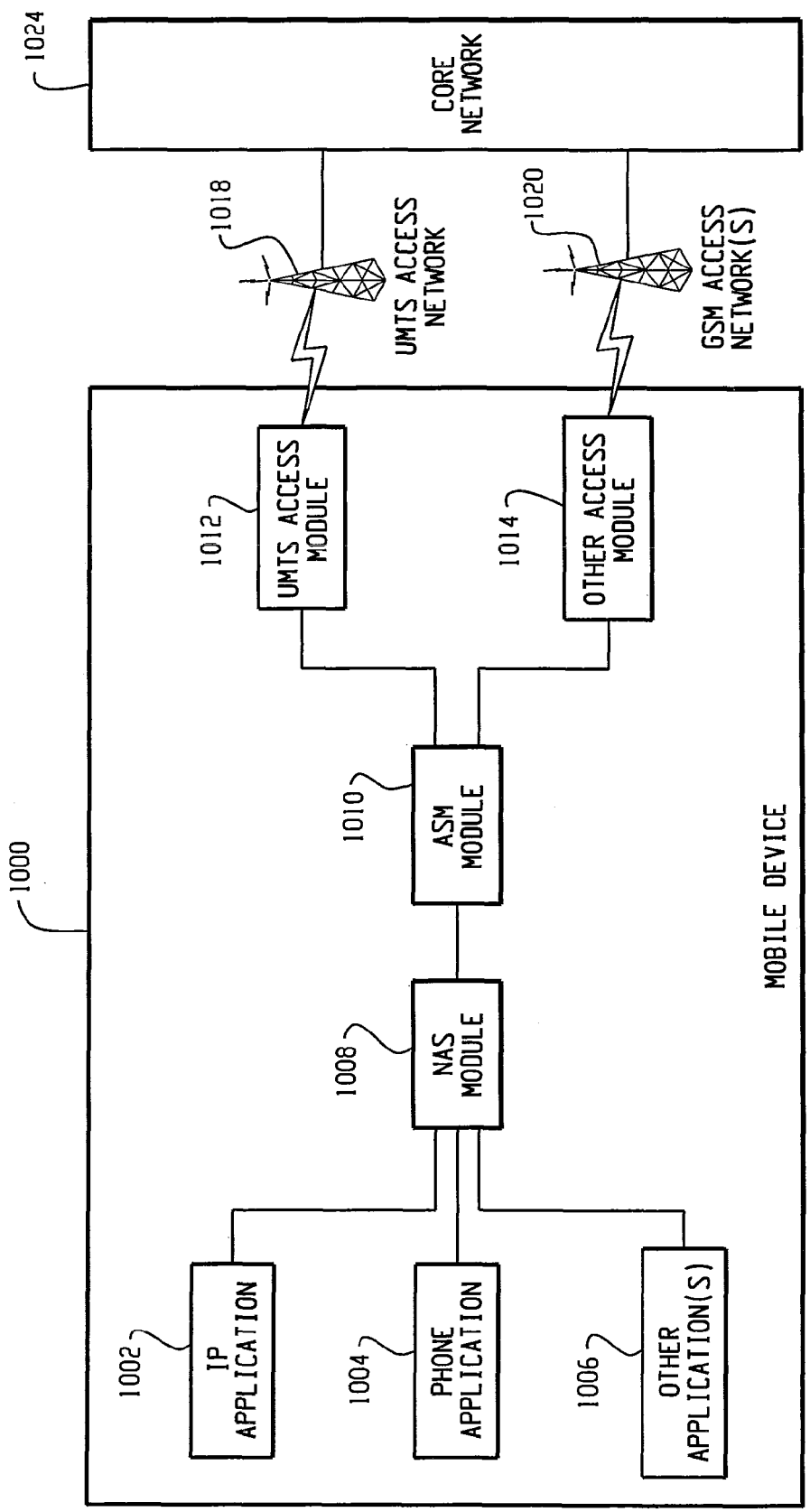
FIG. 5 is a block diagram of an example multi-mode mobile communication service.

FIG. 5 is a block diagram of an example multi-mode mobile communication device 1000. The device 1000 includes a plurality of device applications 1002, 1004, 1006, a non-access stratum (NAS) module 1008, an access stratum manager (ASM) module 1010, a UMTS access module 1012, and a GSM access module 1014. Also illustrated are a UMTS access network 1018, a GSM access network 1020, and a core network 1024.

The device applications may include an IP application 1002 (e.g., an electronic mail application, a web browser application, or others), a telephony application 1004, and/or other applications 1006 that communicate with the core network 1024. The device applications 1002, 1004, 1006 may, for example, be software applications stored in a memory sub-system and executed by a processing sub-system. For example, with reference to FIG. 4, the device applications may be stored in the flash memory 424 and/or RAM 426 and executed by the microprocessor 438 and/or DSP 420. The NAS module 1008, ASM module 1010, UMTS access module 1012, and GSM access module 1014 may be software, hardware, or a combination of software and hardware for implementing a dual-mode protocol stack that is used to setup and maintain communications between the device applications 1002, 1004, 1006 and the core network 1024 over one of the access networks 1018, 1020.

The NAS module 1008 includes the non-access stratum software and any associated hardware for communicating with the core network 1024. The NAS module 1008 applies the wireless protocols necessary to interface the application layers 1002, 1004, 1006 with the core network 1024.

The UMTS module 1012 includes the UMTS access stratum and physical layer software and any associated hardware for communicating with the UMTS access network 1018. Similarly, the GSM access module 1014 includes the GSM access stratum and physical layer software and any associated hardware for communicating with the GSM access network 1020. In addition, the UMTS and GSM access modules 1012, 1014 are operable to receive handover requests from the UMTS and GSM access networks 1018, 1020, and are also operable to initiate a handover request based on measurements taken of the UMTS and GSM access networks 1018, 1020, as described in more detail below with reference to FIG. 7.

For example, if the device 1000 is communicating over the UMTS access network 1018, the UMTS access module 1012 may receive a handover request to transfer the communication link from the UMTS access network 1018 to the GSM access network 1020. In another example, while the device 1000 is communicating over the UMTS access network 1018, the access modules 1012, 1014 may monitor and measure the respective signal strengths of the access networks 1018, 1020. The UMTS access module 1012 may, for example, monitor and measure adjacent GERAN cells and the GSM access module 1014 may monitor and measure adjacent UTRAN cells. In addition, the UMTS and GSM access networks 1012, 1014 may each request cell measurements from the other access network 1020, 1018, as described below with reference to FIG. 7. If the access network measurements indicate that a less lossy communication link could be achieved over the GSM access network 1020, then the UMTS access module 1012 may initiate a handover request. In addition, similar handover requests may be received or initiated by the GSM access module 1014 while the device 1000 is communicating over the GSM access network 1020.

The ASM module 1010 includes the access stratum manager software and any associated hardware for interfacing the UMTS access module 1012 and GSM access module 1014 with the NAS module 1008. The ASM module 1010 is operable to establish a communication link between the NAS module 1008 and the core network 1024 by activating either the UMTS access module 1012 or the GSM access module 1014. In addition, the ASM module 1010 is further operable to maintain the communication link between the NAS module 1008 and the core network 1024 while transferring the communication link between the UMTS and GSM access networks 1018, 1020 in response to a handover request from the UMTS or GSM access modules 1012, 1014. For example, if the UMTS access module 1012 has been activated by the ASM module 1010 to communicate over the UMTS access network 1018 and the ASM module 1010 receives a handover request, then the ASM module 1010 may activate the GSM access module 1014, transfer the communication link from the UMTS access module 1012 to the GSM access module 1014, and deactivate the UMTS access module 1012. In addition, the ASM module 1010 may perform similar functions to transfer a communication link from the GSM access network 1020 to the UMTS access network 1018.

A further description of the operations of the dual mode protocol stack implemented by the NAS module 1008, ASM module 1010, UMTS access module 1012, and GSM access module 1014 is described below with reference to FIGS. 6-15.

Figure 6:
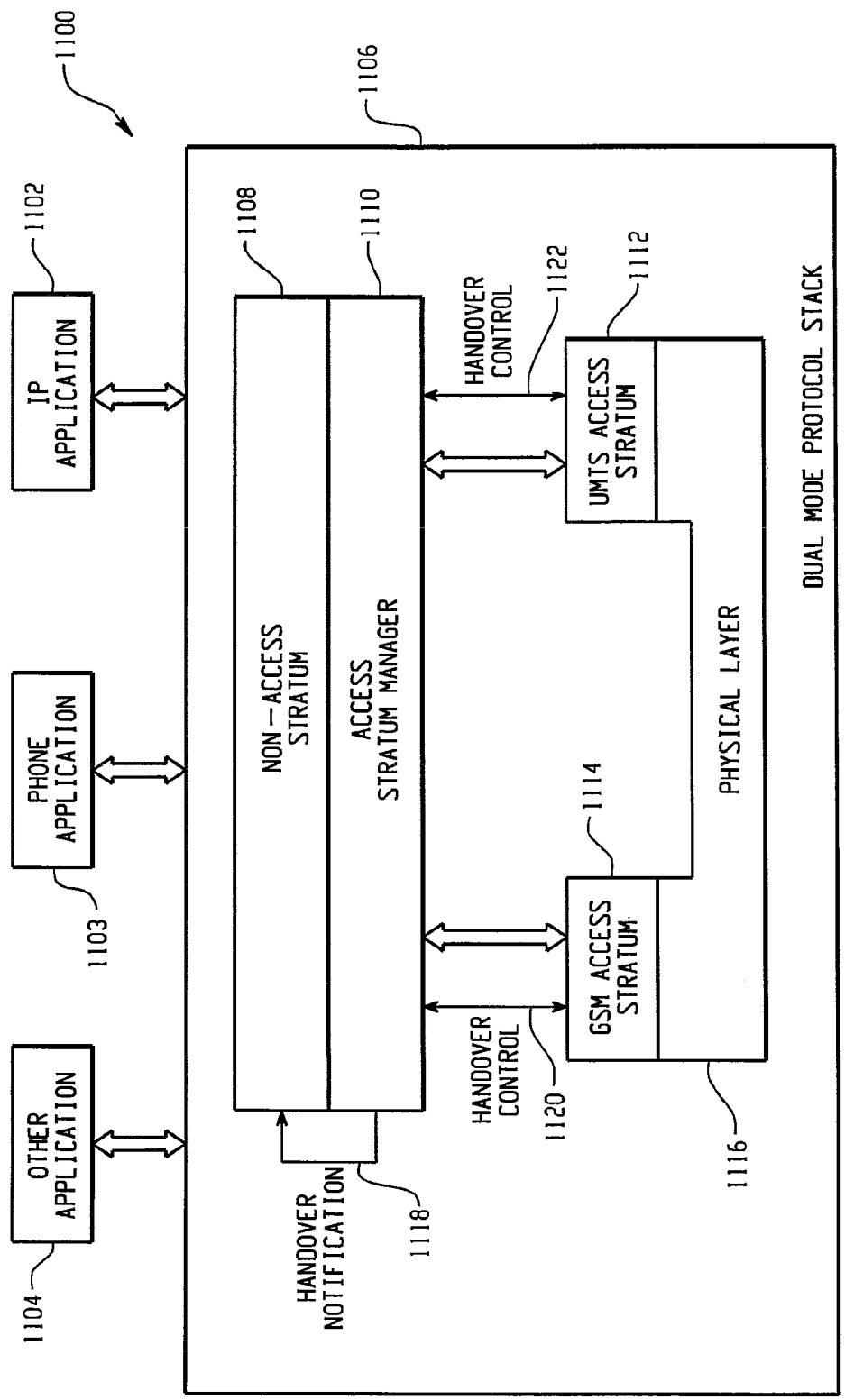
FIG. 6 is a block diagram of an example dual-mode protocol stack for a multi-mode mobile communication device.

FIG. 6 is a block diagram 1100 of an example dual-mode protocol stack 1106 for a multi-mode mobile communication device. The dual-mode protocol stack 1106 includes a non-access stratum 1108, an access stratum manager 1110, a UMTS access stratum 1112, a GSM access stratum 1114 and a physical layer 1116. Also illustrated are an IP application 1102, a phone application 1103, and other device applications 1104 that interface with the dual-mode protocol stack 1106.

The non-access stratum 1108 (NAS) controls communications between the device applications 1102-1104 and a core network 1024. A more detailed description of the NAS 1108 is included in Standard document 3GPP TS 24.008, which is incorporated herein by reference.

The UMTS access stratum 1112 controls communications over the UMTS access network 1018, and the GSM access stratum 1114 controls communications over the GSM access network 1020. In addition, the UMTS and GSM access strata 1112, 1114 are operable to receive handover requests from the UMTS and GSM access networks 1018, 1020, and to initiate handovers based on the respective signal strengths of the access networks 1018, 1020, as described below with reference to FIG. 7.

The physical layer 1116 provides the physical interface(s) to the UMTS and GSM access networks 1018, 1020. The physical layer 1116 may include portions specific to the protocols of the UMTS and GSM access networks 1018, 1020, and may also include common portions used for connecting to either access network 1018, 1020.

The access stratum manager 1110 interfaces the NAS 1108 with the UMTS and GSM access strata 1112, 1114. In operation, when the NAS 1108 receives a command to establish a communication link between a device application 1102-1104 and a core network 1024, the access stratum manager 1110 activates one of the UMTS access stratum 1112 or GSM access stratum 1114 to provide the air interface link over either the UMTS or GSM access network 1018, 1020. (See, e.g., FIGS. 11 and 12). Once communications have been established, the active access stratum 1112 or 1114 may request that communications be transferred to the non-active access network 1112 or 1114 by sending a handover control signal 1120, 1122 to the access stratum manager 1110. (See, e.g., FIG. 14). Upon receiving a handover control signal 1120, 1122, the access stratum manager 1110 initiates a handover procedure between the UMTS and GSM access strata 1112, 1114. During the handover procedure, the access stratum manager 1110 establishes a new connection between the target access stratum 1112 or 1114 and the NAS 1108 and deactivates the old connection to the original access stratum 1112 or 1114. In addition, the access stratum manager 1110 also transmits a handover notification signal 1118 to the NAS 1108 which allows it to initiate an appropriate location updating procedure in the new access network. In this manner, communications may typically be transferred between the UMTS and GSM access networks 1018, 1020 without any appreciable loss in quality of service (QoS).

Figure 7:
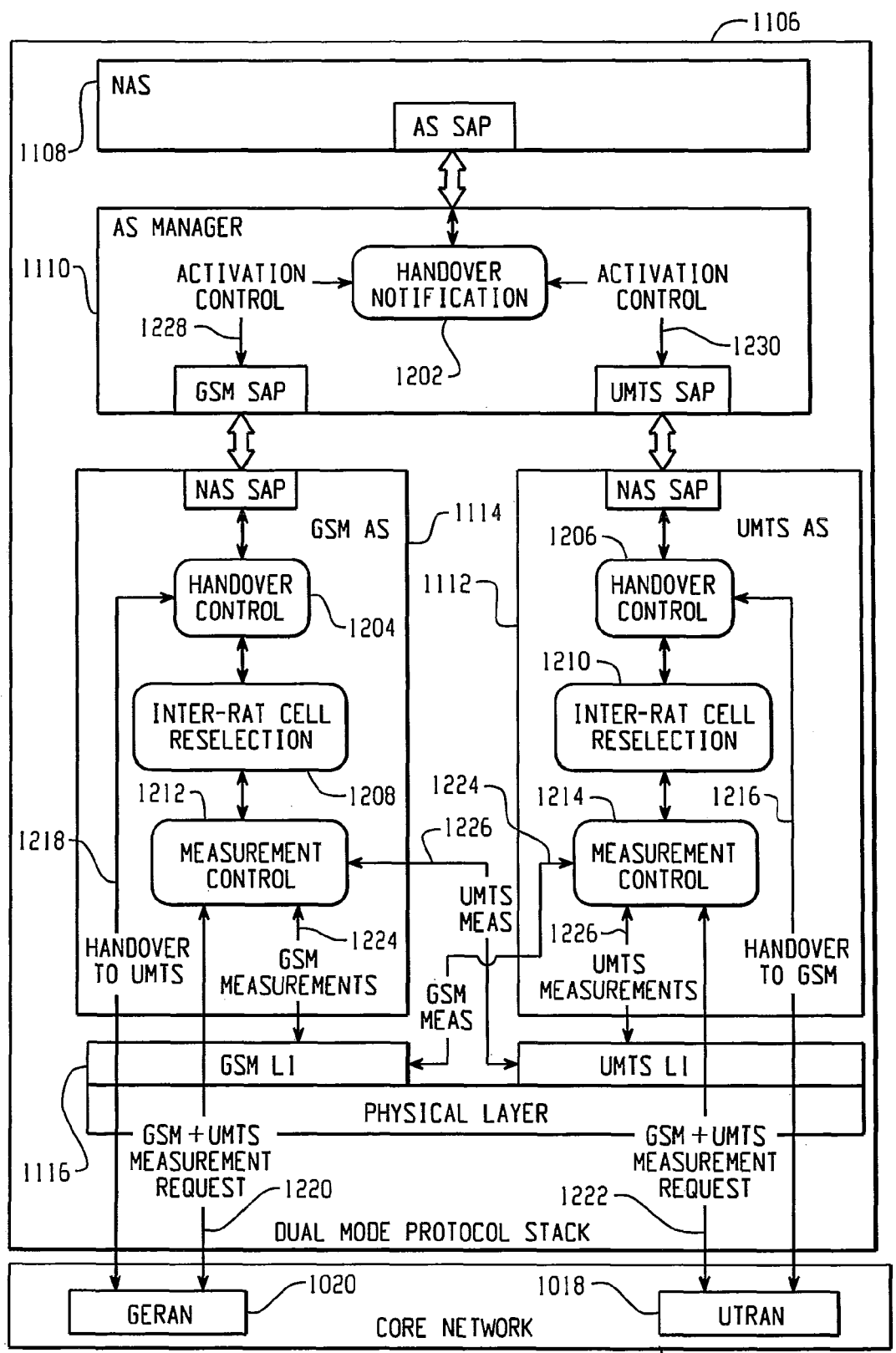
FIG. 7 is a more-detailed block diagram of the example dual-mode protocol stack shown in FIG. 6 that illustrates example sub-programs for initiating and controlling the handover procedure between the UMTS and GSM access networks.

FIG. 7 is a more-detailed block diagram of the example dual-mode protocol stack 1106 shown in FIG. 6 that illustrates example sub-programs for initiating and controlling the handover procedure between the UMTS and GSM access networks 1018, 1020. The UMTS and GSM access strata 1112, 1114 each include a handover control sub-program 1204, 1206, a cell reselection sub-program 1208, 1210, and a measurement control sub-program 1212, 1214. The access stratum manager 1110 includes a handover notification sub-program 1202.

Within the UMTS and GSM access strata 1112, 1114, the measurement control sub-programs 1212, 1214 communicate with the physical layer 1116 to request signal strength measurements of adjacent cells belonging to the UMTS and GSM access networks 1018, 1020. As illustrated, the measurement control sub-program in each of the UMTS and GSM access strata 1212, 1214 may send both a GSM measurement request signal 1224 and a UMTS measurement request signal 1226 to the physical layer 1116. That is, the active access stratum 1112 or 1114 may initiate signal strength measurements of cells belonging to both access networks 1018, 1020, while the inactive access stratum 1112 or 1114 remains idle. In this manner, both access networks 1018, 1020 may be actively measured while conserving device resources. These measurement requests may be initiated either by the cell reselection sub-programs, 1208, 1210 when the dual-mode protocol stack is responsible for cell-reselection or by a signal 1220, 1222 received from the currently active access network 1018, 1020. The active measurement control subprogram returns the measurement results to the originating source as appropriate.

The cell reselection sub-program 1208, 1210 in the active access stratum 1112 or 1114 receives and compares the signal strength measurements of cells in the UMTS and GSM access networks 1018, 1020 from the active measurement control sub-program 1212, 1214. The cell reselection sub-program 1208, 1210 may, for example, include pre-determined signal strength criteria that it used to determine when the device should initiate a handover procedure. For example, if the measured signal strength of the active access network falls below a pre-selected minimum threshold level and the measured signal strength of the other access network is above a pre-selected threshold level, then the cell reselection sub-program may signal the active handover control sub-program 1204, 1206 to request a handover.

The active handover control sub-program 1204 or 1206 receives internal handover requests from the cell reselection sub-program 1208 based on signal strength measurements taken by the mobile device, and may also receive external handover requests 1216, 1218 from the current access network 1018 or 1020. In response to receiving a handover request from the cell reselection sub-program 1208, 1210 or from the access network 1018, 1020, the handover control sub-program generates the handover request signal to the access stratum manager 1110.

The access stratum manager 1110 initiates the handover procedure, as described above, in response to the handover request signal from the active handover control sub-program 1204, 1206. In addition, the handover notification sub-program 1202 generates a handover notification signal to the NAS 1108 to inform the NAS 1108 of the handover from the old access stratum to the target access stratum. The handover notification signal may include configuration details of the target access stratum and network to identify any change in operational parameters resultant from the handover.

Figure 8:
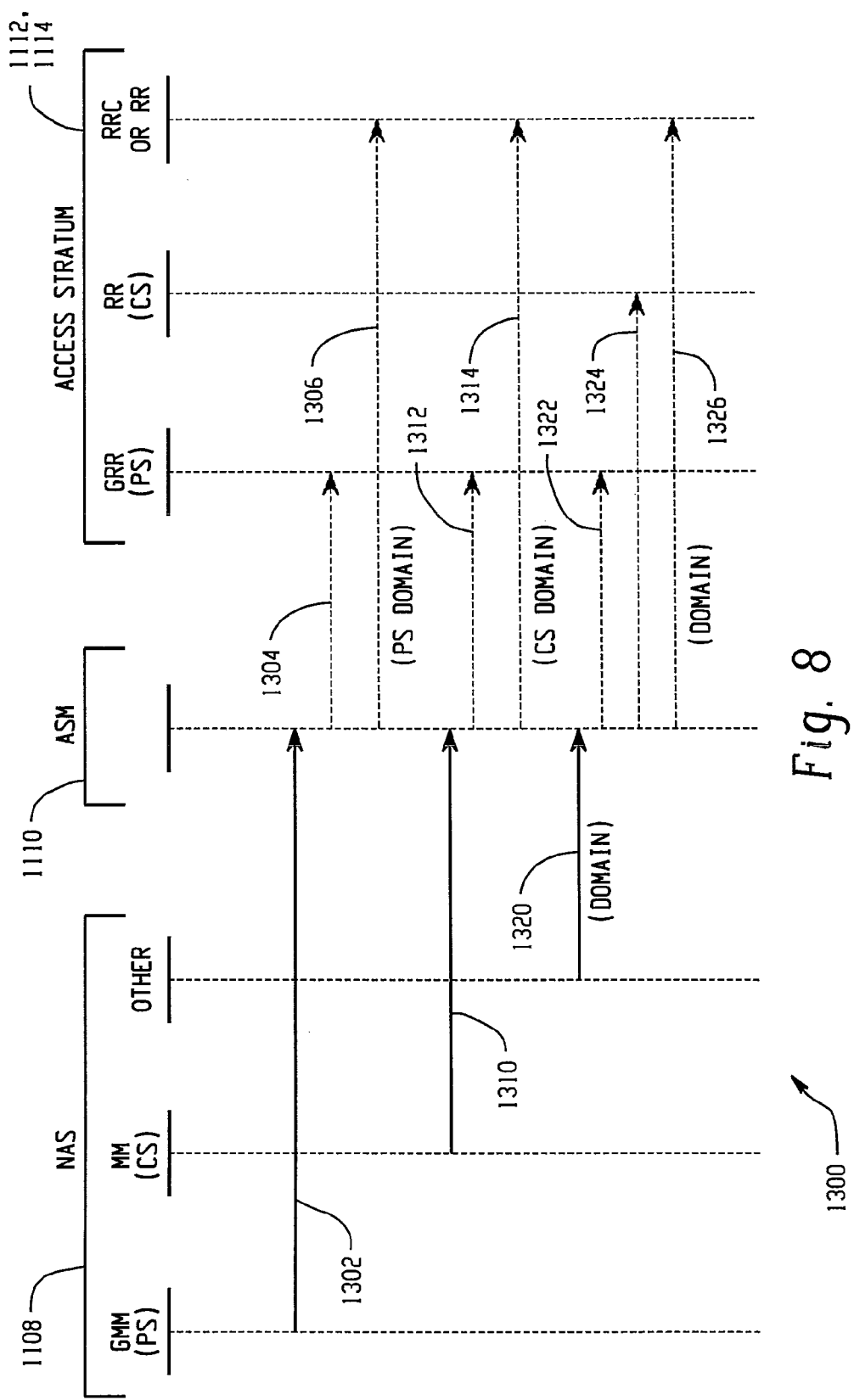
FIGS. 8-15 are signal flow diagrams illustrating example operations of a dual mode protocol stack.
Figure 9:
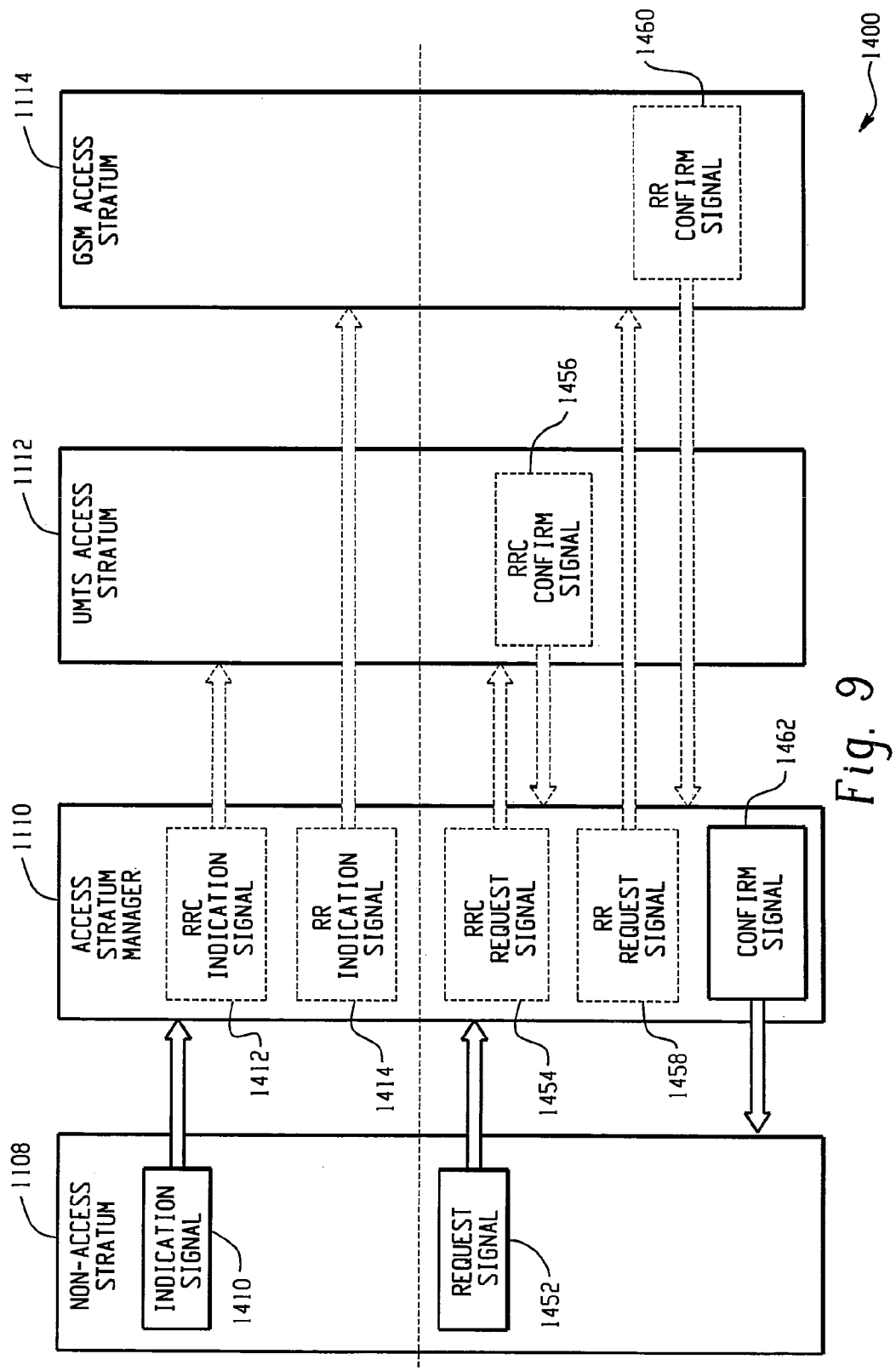

FIGS. 8-15 are signal flow diagrams illustrating example operations of a dual mode protocol stack 1106. FIGS. 8 and 9 are signal flow diagrams illustrating example signal routing in a dual mode protocol stack 1106 during normal operation. FIG. 8 shows example signal routing for domain specific signals (e.g., packet switched (PS) or circuit switched (CS) signals), and FIG. 9 shows example signal routing for signals that are not domain specific.

With reference first to FIG. 8, three signals 1302, 1310, 1320 are shown being generated by the NAS 1108 and routed to the appropriate module within the access strata 1112, 1114. A first domain-specific signal 1302 is originated from a packet switched (PS) specific module within the NAS 1108, such as a GMM (GPRS Mobility Management) module. When the access stratum module 1110 receives the first domain-specific signal 1302, it detects that the signal 1302 has originated from a packet switched (PS) specific module within the NAS 1108, and routes the new signal 1304 to either a packet-switched specific module within the access strata such as a GRR (GPRS Radio Resource control) module, or adds a parameter to the signal indicating it belongs to the PS domain and routes the new signal 1306, to a non-domain-specific module within the access strata 1112, 1114, such as a RRC (Radio Resource Control) module or possibly a RR ([GSM] Radio Resource) module (a RR module may be domain specific or non-domain specific).

A second domain-specific signal 1310 is originated from a circuit switched (CS) specific module within the NAS 1108, such as a MM (Mobility Management) module. When the access stratum module 1110 receives the second domain-specific signal 1310, it detects that the signal 1310 has originated from a circuit switched (CS) specific module within the NAS 1108, and routes the new signal 1312 to either a circuit-switched module such as a RR module within the GSM access stratum, 1114, or adds a parameter indicating the signal belongs to the CS domain and sends this new signal, 1314, to a non-domain-specific module within the access strata 1112, 1114, such as a RRC module or possibly a RR module.

A third domain-specific signal 1320 is originated from a module (OTHER) within the NAS 1108 that is not itself domain specific. In this case, the NAS 1108 adds a domain-specific parameter to the signal 1320 that indicates the proper domain (e.g., PS or CS). When the signal 1320 is received by the access stratum manager 1110, the domain-specific parameter is detected by the access stratum manager 1110. At this point, three alternatives are illustrated. First, a new signal, 1322, stripped of its PS domain-specific parameter may be sent to a PS domain-specific module of the access stratum, for example, the GRR of the GSM access stratum, 1114. Second, a new signal, 1324, stripped of its CS domain-specific parameter may be sent to a CS domain-specific module of the access stratum, for example, the RR of the GSM access stratum, 1114. Third, the signal, 1326, still containing its domain-specific parameter, may be passed to a non-domain-specific module of the access stratum, such as the RRC of the UMTS access stratum, 1112.

With reference now to FIG. 9, an indication signal 1410 and a request signal 1452 are shown being generated by the NAS 1108 and routed to the appropriate access stratum 1112 or 1114. When generated by the NAS 1108, the indication signal 1410 and request signal 1452 are generic in the sense that they are not formatted for a particular access network. Upon receiving the generic signal 1410, 1452 from the NAS 1108, the access stratum manager 1110 formats the signal 1410, 1452 based on which of the access stratum 1112, 1114 is currently active, and forwards the formatted signal 1412, 1414, 1454, 1458 to the active access stratum 1112 or 1114. In the case of a request signal 1454, 1458, the active access stratum 1112 or 1114 returns a confirm signal 1456, 1460 to the access stratum manager 1110. The access stratum manager 1110 then reformats the received confirm signal 1456 or 1460 into a generic confirm signal 1462 and routes the generic signal 1462 to the NAS 1108.

Figure 10:
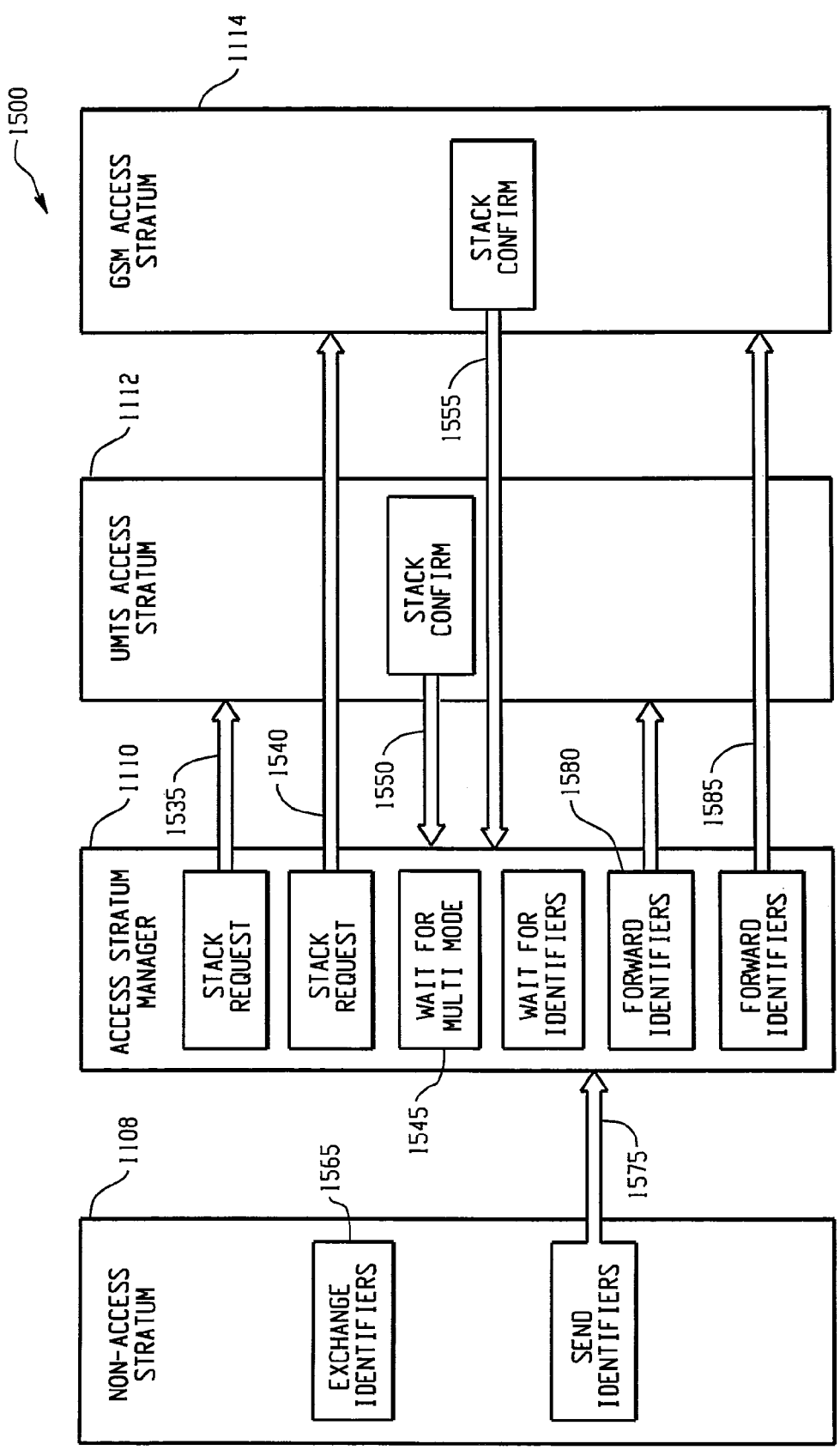

FIG. 10 is a signal flow diagram 1500 illustrating example signal routing within the dual mode protocol stack 1106 when the device is initialized (e.g., at start-up).

The initialization sequence 1500 begins with the access stratum manager 1100 generating stack request signals 1535, 1540 for initializing the UMTS access stratum 1112 and the GSM access stratum 1114, respectively. The access stratum manager 1110 then waits for stack confirmation signals 1550, 1555 from the access stratum 1112, 1114 for a pre-defined period of time 1545.

Within the NAS 1108, there are various NAS sub-modules that may have to communicate directly with the access strata 1112, 1114. These identifiers 1575 are communicated to the access stratum manager 1110, which forwards the identifiers 1580, 1585 to the access strata 1112, 1114 to complete the initialization sequence 1500.

Figure 11:
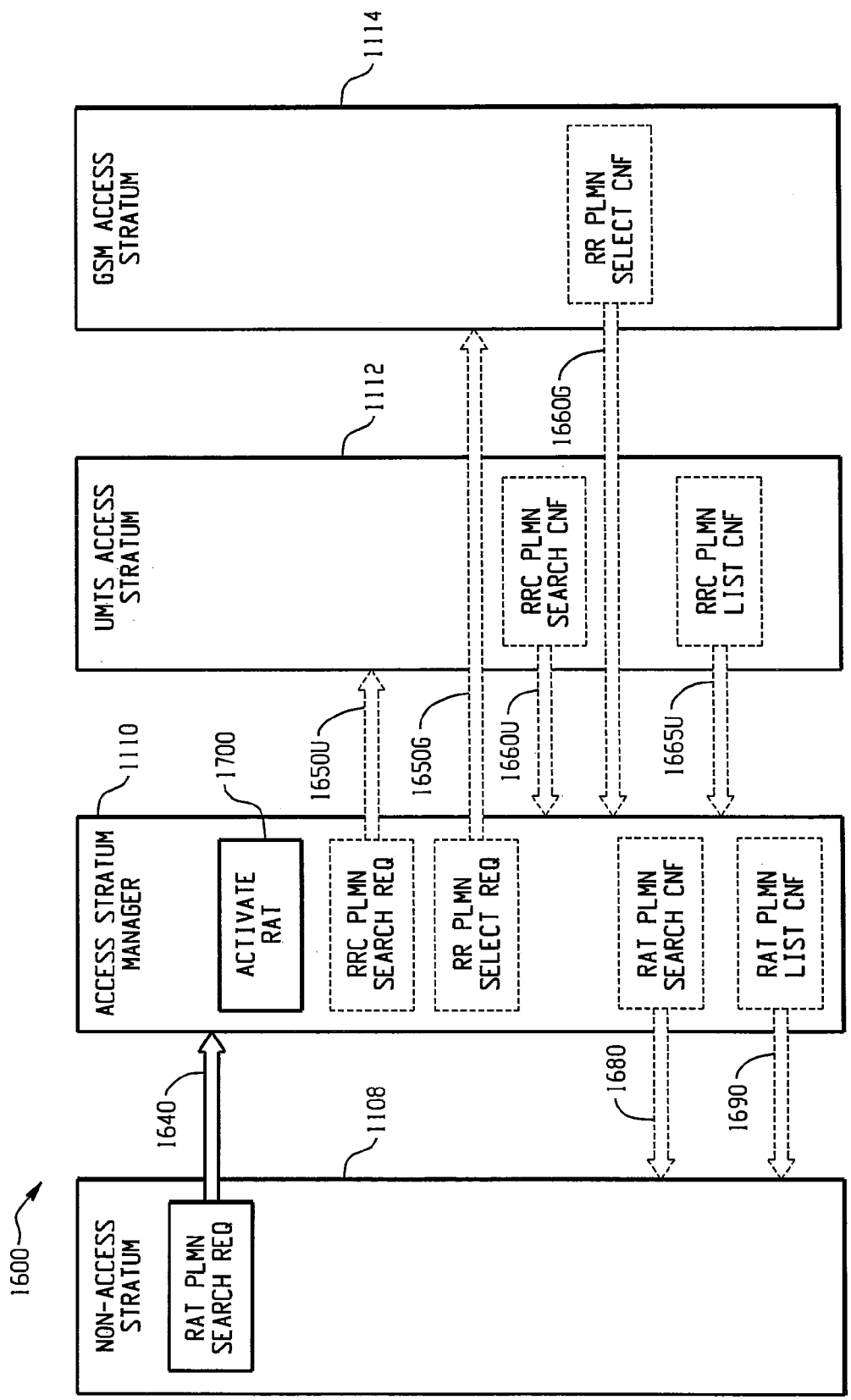

FIG. 11 is a signal flow diagram 1600 illustrating example signal routing within the dual mode protocol stack 1106 to select a public land mobile network (PLMN). This sequence may, for example, be initiated following the initialization sequence shown in FIG. 10. The NAS 1108 determines a priority order for the available PLMNs and their respective radio access technologies (RATs), in accordance with the 3GPP standards. (See, e.g., Standard Document TS 23.122). Based on this determination, the NAS 1108 instructs the access stratum manager 1110 to select the highest priority PLMN/RAT by generating a RAT PLMN search request signal 1640. The RAT PLMN search request signal 1640 may, for example, include a mode parameter, a PLMN identification, a RAT type indicator, and a list of any equivalent PLMNs. The mode parameter may, for example, control details of the PLMN selection operation, such as instructing the access stratum manager 1110 to perform a full initial search, use stored details to speed up the search, search for any acceptable cell, or other instructions.

Upon receiving the RAT PLMN search request 1640, the access stratum manager 1110 activates 1700 the access stratum 1112 or 1114 associated with the selected PLMN (see FIG. 12), and generates a PLMN search request signal 1650U or 1650G to the activated access stratum 1112 or 1114. The PLMN search request 1650U or 1650G identifies the selected PLMN, and may include the mode parameter, the list of equivalent PLMNs, or other relevant information. The activated access stratum 1112 or 1114 then scans the air interface for the selected PLMN.

If the selected PLMN is located by the active access stratum 1112 or 1114, then the access stratum camps on the strongest cell in that PLMN and returns a PLMN select confirm signal 1660U or 1660G to the access stratum manager 1110. The PLMN select confirm 1660U or 1660G may, for example, indicate that the selected PLMN was successfully contacted, and may also include a PLMN identification. In response, the access stratum manger 1110 generates a PLMN search confirm signal 1680 to the NAS 1108. The PLMN search confirm signal 1680 may, for example, include a success code, the PLMN identification and a RAT type identification If the selected PLMN is not located by the active access stratum 1112 or 1114, then the selected access stratum may return a failure code and identify any PLMNs that were located. If a GSM PLMN was searched for, then the failure code and list of located PLMNs may be returned to the access stratum manager 1110 in a PLMN select signal 1660G from the GSM access stratum 1114. If a UMTS PLMN was searched for, however, then the UMTS access stratum 1112 generates a PLMN list confirmation signal that includes the failure code and identifies the located PLMNs. In addition, upon failing to locate the selected PLMN, the active access stratum 1112 or 1114 may camp on one of the located PLMNs to enable emergency calls. The access stratum manager 1100 may then generate a RAT PLMN signal 1690 to the NAS 1108 that includes the list of located PLMNs and the failure code. The NAS 1108 may then determine the next highest priority PLMN/RAT and repeat the PLMN selection sequence 1600. In addition, if the home PLMN of the device is not located, then the sequence 1600 may be repeated at pre-selected time intervals to search for a better PLMN, as detailed in the 3GPP Standard Document TS23.122.

Figure 12:
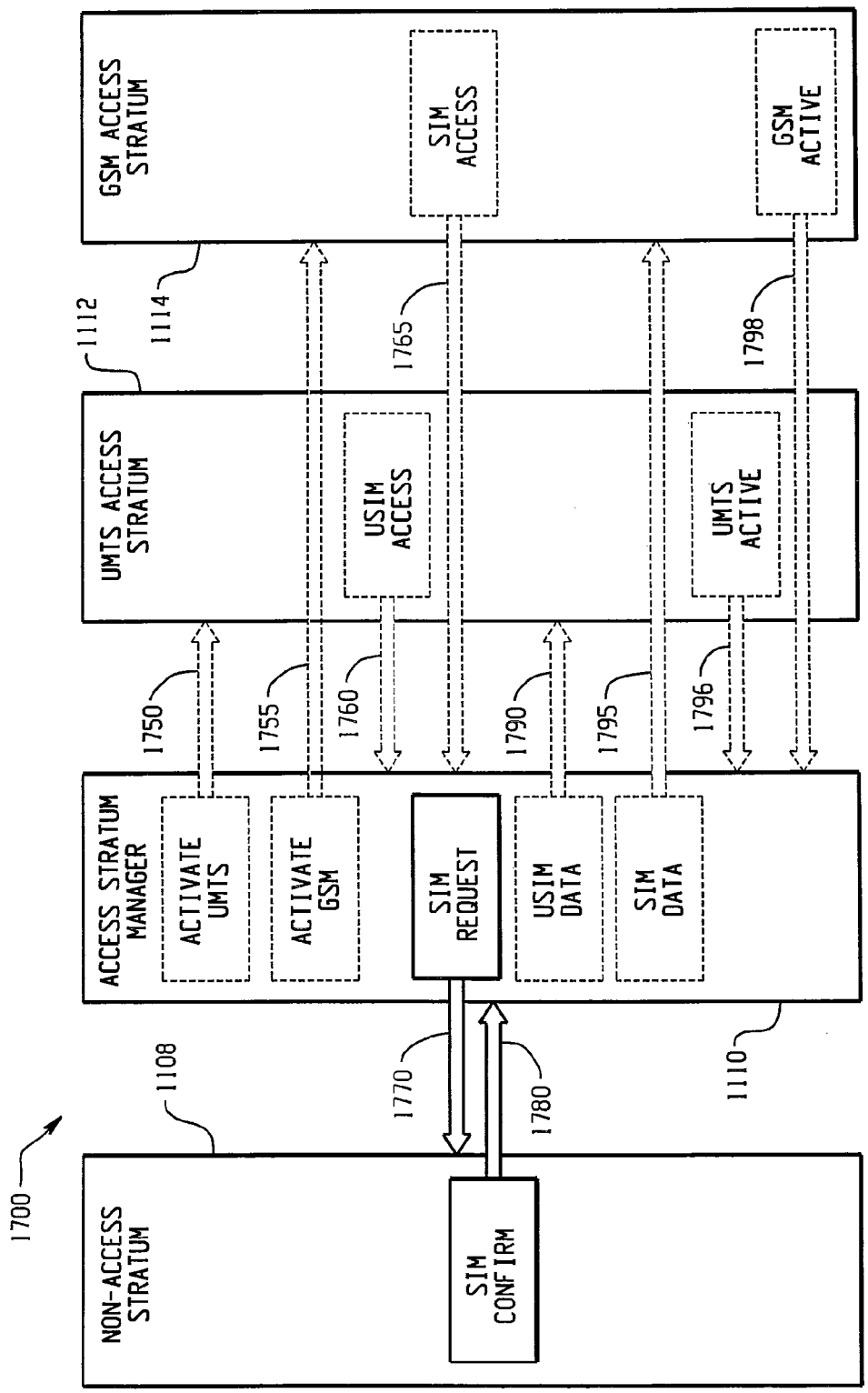

FIG. 12 is a signal flow diagram illustrating example signal routing within the dual mode protocol stack 1106 to activate an access stratum 1112, 1114. This activation sequence 1700 may, for example, be initiated by the PLMN selection procedure 1600 shown in FIG. 11. The sequence 1700 begins with an activate signal 1750 or 1755 specific to the selected access stratum 1112 or 1114 being generated by the access stratum manager 1110. Upon receiving the activate signal 1750 or 1755, the selected access stratum 1112 or 1114 may require data located in the device USIM (for UMTS) or SIM (for GSM) and sends a request for the necessary USIM access 1760 or SIM access 1765 parameters to the access stratum manager 1110.

The access stratum manager 1110 converts the request 1760 or 1765 from the access stratum 1112 or 1114 into a generic SIM request 1770 that is forwarded to the NAS 1108. The NAS 1108 then extracts the required USIM or SIM parameters, and returns the information to the access stratum manager 1110 in a SIM confirm signal 1780. The access stratum manager 1110 forwards the data to the selected access stratum 1112 or 1114 in a USIM or SIM data signal 1790 or 1795. Upon receiving the USIM or SIM data signal 1790 or 1795, the selected access stratum 1112 or 1114 is able to complete its activation and returns an activate confirmation signal 1796 or 1798 to the access stratum manager 1110.

Figure 13:
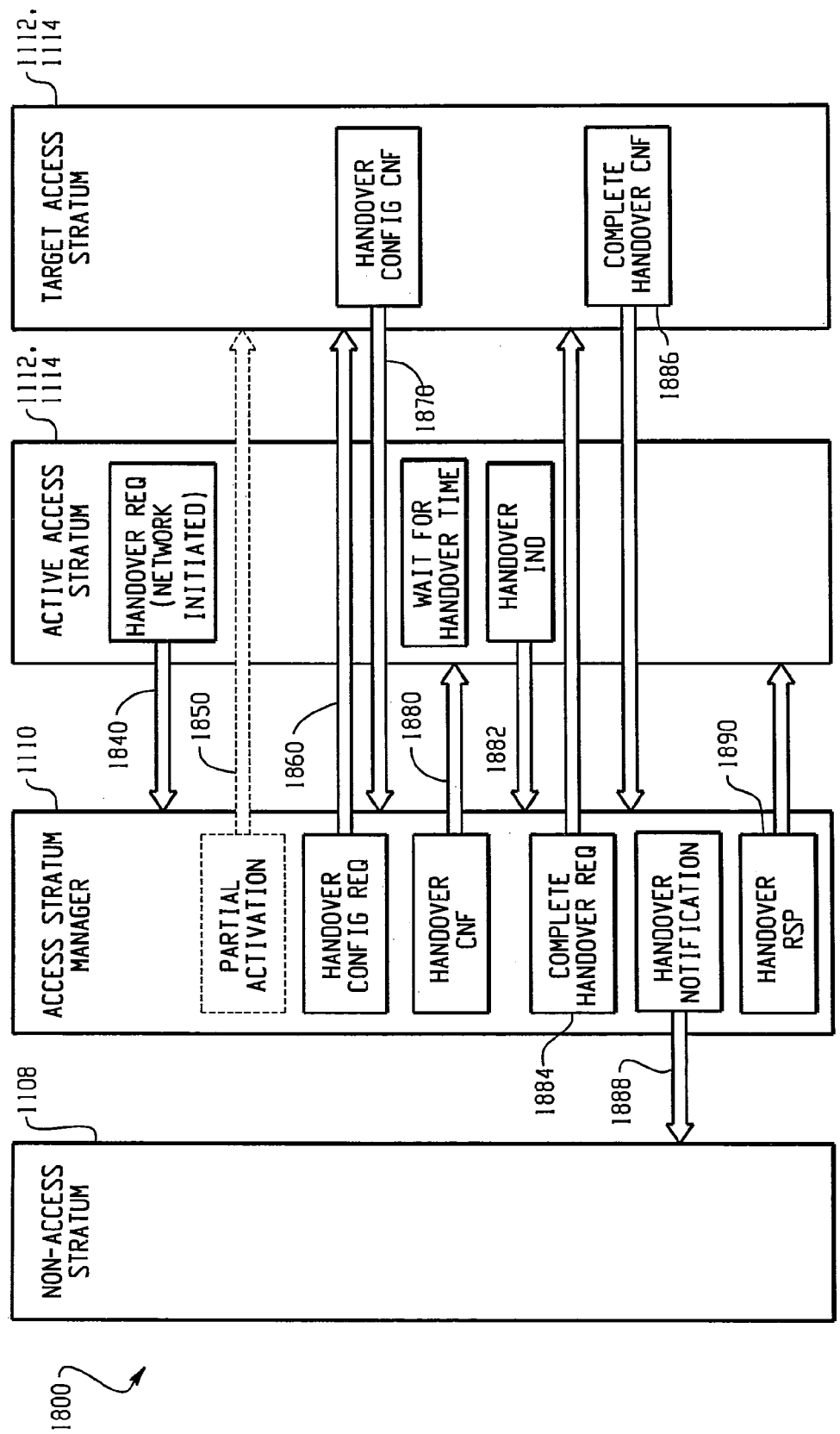

FIG. 13 is a signal flow diagram 1800 illustrating example signal routing within the dual mode protocol stack 1106 to implement a network initiated handover sequence. The handover sequence 1800 begins when a cell change order or a handover command 1216, 1218 (see FIG. 7) is received from the access network by the active access stratum 1112 or 1114. Note this could be either a handover command or a cell change order. The active access stratum 1112 or 1114 validates the handover command 1216, 1218 and extracts any encoded information necessary to implement the handover (i.e. intended for the target access stratum) and includes the encoded handover information in a handover request signal 1840 to the access stratum manager 1110.

Upon receiving the handover request 1840, the access stratum manager 1110 partially activates (if necessary to bring it to a state where it can respond to the handover request) the target access stratum 1112 or 1114, and passes the encoded handover information to the target access stratum 1112 or 1114 in a handover configuration request signal 1860. The handover configuration request 1860 includes the encoded information necessary to configure the target access stratum 1112 or 1114 for communication with the desired network. It may also include a list of equivalent PLMNs. The target access stratum 1112 or 1114 then configures itself by decoding and processing the configuration information included in the handover configuration request 1860, and may also pre-configure the physical layer in preparation for activation with the new network. If the configuration is successful, then the target access stratum 1112 or 1114 returns a handover configuration confirmation signal 1870 to the access stratum manager 1110 indicating that the target access stratum 1112 or 1114 is ready to take control of network communication. Otherwise, if the configuration is invalid or unsupported by the target access stratum 1112 or 1114, then the handover configuration confirm signal 1870 is returned with a failure status message and an appropriate error code.

If the handover configuration signal 1870 indicates that the configuration is invalid or unsupported, then the handover sequence 1800 is aborted and the error code and failure message are returned to the core network. Otherwise, if the handover configuration confirmation signal 1870 indicates that the target access stratum 1112 or 1114 is ready to take over network communication, then a handover confirmation signal is sent from the access stratum manager 1110 to the active access stratum 1112 or 1114 indicating that the target access stratum 1112 or 1114 is configured. The active access stratum 1112 or 1114 may then handover either immediately, or may defer handover for a predetermined time period to synchronize with changes at the network. If handover is immediate, then the active access stratum 1112 or 1114 may release control of the physical layer but without, at this point, releasing control of its other internal resources (i.e. those in layer two and the NAS 1108). If handover is deferred, then the active access stratum 1112 or 1114 waits for the specified time period and then releases control of the physical layer. In either case, once the physical layer is released, the active access stratum 1112 or 1114 sends a handover indication signal 1882 to the access stratum manager 1110.

Upon receiving the handover indication signal 1882, the access stratum manager 1110 sends a complete handover request signal 1884 to the target access stratum 1112 or 1114 indicating that the target access stratum 1112 or 1114 may take control of network communication. The target access stratum 1112 or 1114 then completes its physical layer configuration and attempts to select the cell specified in the handover configuration 1860 and establish a signaling connection to the core network. If the target access stratum 1112 or 1114 establishes a successful connection to the core network, then a complete handover confirmation signal 1886 is returned to the access stratum manager indicating that the handover operation was successful. If the connection to the core network is unsuccessful, however, then the target access stratum 1112 or 1114 switches control of the physical layer back to the active access stratum 1112 or 1114, frees its internal resources, and returns the complete handover confirmation signal with an error code.

Upon receiving a complete handover confirmation signal 1886 indicating a successful handover, the access stratum manager 1110 generates a handover notification signal 1888 to the NAS 1108 indicating that a successful handover has been completed and signaling the NAS 1108 to initiate any appropriate location updating procedures. In addition, upon a successful handover, the access stratum manager 1110 generates a handover response signal 1890 to the originally active access stratum 1112 or 1114 indicating a successful handover. The originally active access stratum 1112 or 1114 may then free all its internal and any NAS resources.

If the complete handover confirmation signal 1886 indicates that the target access stratum 1112 or 1114 could not connect to the core network, then the access control manager 1110 forwards the error code information to the originally active access stratum 1112 or 1114 in a handover response signal 1890. The originally active access stratum 1112 or 1114 then reconnects to the physical layer and sends a handover failure message to the core network.

In addition, the originally active access stratum 1112 or 1114 may start a timer upon sending the handover indication signal 1882 to the access stratum manager 1110. If the handover response signal 1890 is not returned before the timer expires, then the originally active access stratum 1112 or 1114 may send a handover abort signal to the access stratum manager 1110, instructing the access stratum manager 1110 to deactivate the target access stratum 1112 or 1114. The access stratum manager 1110 may then return a handover abort confirm signal to the originally active access stratum 1112 or 1114, which retakes control of the physical layer and restores its previous configuration. A handover failure message may then be transmitted from the reactivated access stratum 1112 or 1114 to the core network.

Figure 14:
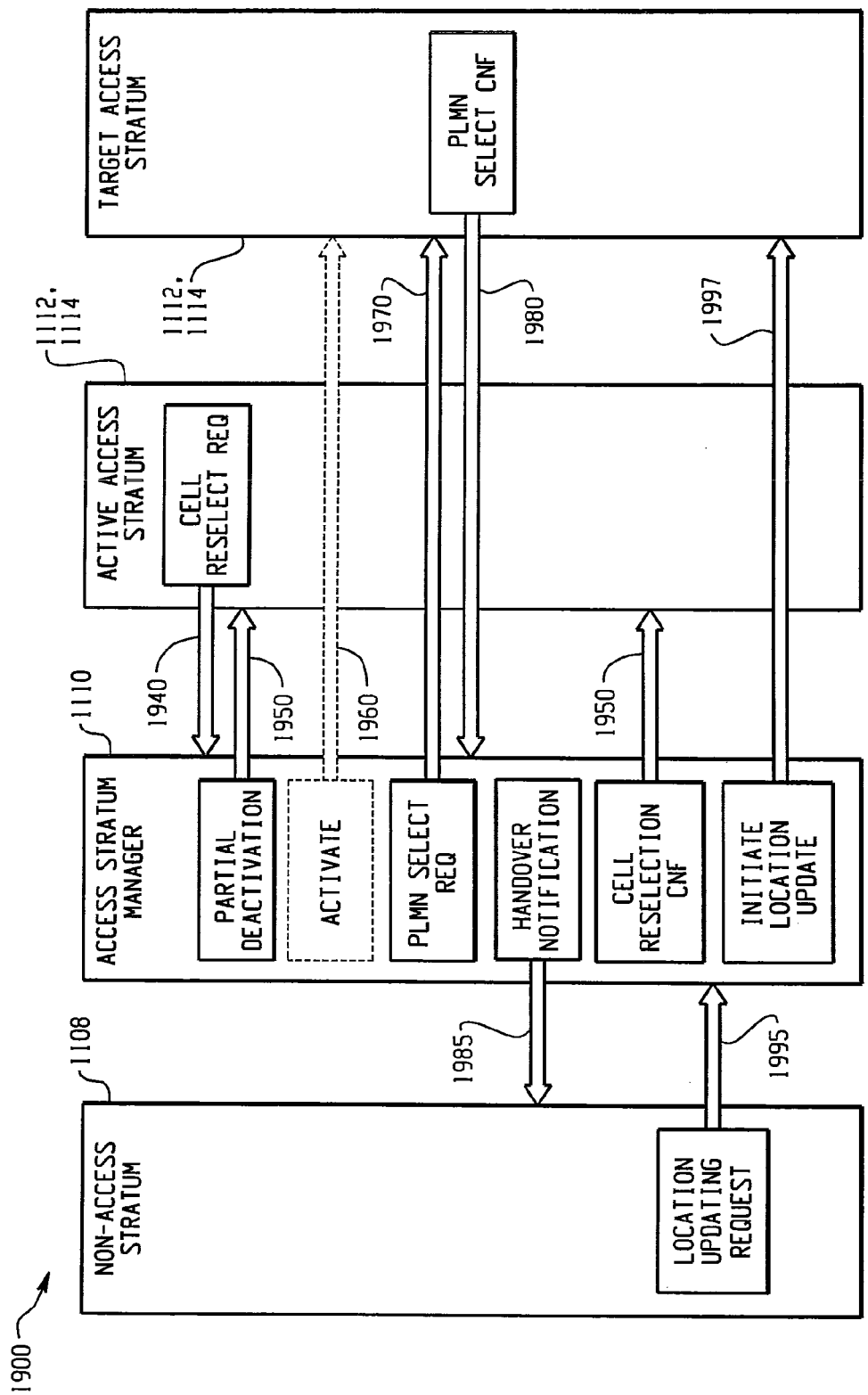

FIG. 14 is a signal flow diagram illustrating example signal routing within the dual mode protocol stack 1106 to implement an internally initiated handover sequence 1900. The handover sequence 1900 may, for example, be initiated by an inter-RAT cell reselection event. The handover sequence 1900 begins with a cell reselect request 1940 generated by the active access stratum 1112 or 1114 in response to system information broadcast from the current cell and from the measured signal strengths of the current and neighboring cells, as described above with reference to FIG. 7. That is, the active access stratum 1112 or 1114 may continually monitor for a better cell, and may generate the inter-RAT cell reselect request if it locates a better cell in the inactive (target) access network 1112 or 1114.

The cell reselect request 1940 is received by the access stratum manager 1110, which responds by generating a partial deactivation signal 1950 to the active access stratum 1112 or 1114 instructing the active access stratum 1112 or 1114 to release control of the physical layer. The access stratum manager 1110 then activates the target access stratum 1112 or 1114 (as described in FIG. 12) and sends a PLMN select request signal 1970. The PLMN select request signal 1970 includes the 'better' cell details and a mode parameter to ensure that the target access stratum 1112 or 1114 selects that cell and no other. Upon receiving the PLMN select request 1970, the target access stratum 1112 or 1114 locates and camps on the specified cell and returns a PLMN select confirmation signal 1980 to the access stratum manager 1110 indicating a successful connection. If the target access stratum 1112 or 1114 does not successfully locate and connect to the desired cell, then an error code is returned in the PLMN select confirmation signal 1980 to the access stratum manager 1110.

If the PLMN select confirmation 1980 indicates a successful connection, then the access stratum manager 1110 generates a handover notification signal 1985 to the NAS 1108 that indicates that a new PLMN has been selected, and also identifies the selected PLMN and RAT type. In addition, the access stratum manager 1110 sends a cell reselection confirm 1950 to the originally active access stratum 1112 or 1114 that instructs the access stratum to free up all of its resources and enter an inactive state. The NAS 1108 then generates a location updating request 1995 to the access stratum manager 1110, which sends a corresponding signal 1997 to the target access stratum 1112 or 1114 to establish a signaling connection to initiate a location updating procedure.

If the PLMN select confirmation signal 1980 from the target access stratum 1112 or 1114 indicates a failed attempt to establish a network connection, then the access stratum manager 1110 sends a deactivate command to the target access stratum 1112 or 1114. The access stratum manager 1110 then sends a cell reselection confirm signal 1950 to the originally active access stratum 1112 or 1114 with a failure code. In response to the failure code, the originally active access stratum 1112 or 1114 may retake control of the physical layer and attempt to reconnect to a cell in the original RAT.

Figure 15:
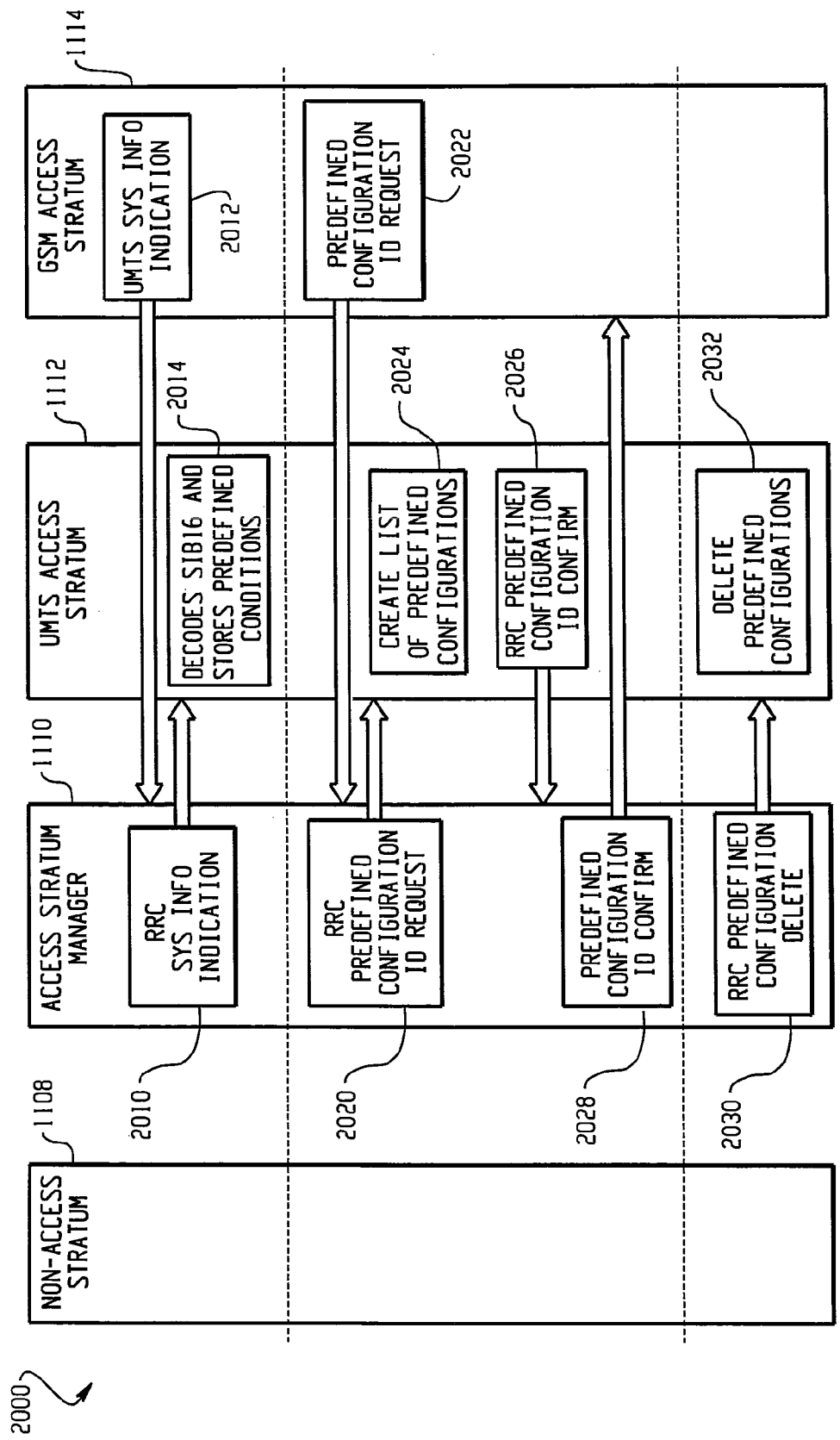

FIG. 15 is a signal flow diagram illustrating example signal routing within the dual mode protocol stack 1106 for handling UMTS system information blocks (SIB) while in GSM mode. When the dual-mode device is in GSM mode (e.g., the GSM access stratum 1114 is active), the device may be required by the network specifications to receive and respond to information that is broadcast from UMTS cells, such as pre-defined UTMS configuration details (e.g., SIB16). When the active GSM access stratum 1114 receives a SIB16 broadcast including UMTS pre-defined configuration information, then the encoded UMTS configuration information is forwarded to the access stratum manager 1110 in a UMTS system information indication signal 2012. The access stratum manager 1110 then reformats the encoded UMTS configuration information into a RRC system information indication signal 2010 and routes the signal 2010 to the UMTS access stratum 1112 for processing. Upon receiving the RRC system information indication signal 2010, the UMTS access stratum 1112 decodes the pre-defined UMTS configuration information and stores the decoded configuration details in a memory location.

After the predefined UMTS configuration details have been decoded and stored by the UMTS access stratum 1112, the GSM access stratum 1114 may query the access stratum manager 1110 with a predefined configuration identification request 2022. The request signal 2022 is then reformatted by the access stratum manager 1110 into an RRC predefined configuration request signal 2020 and routed to the UMTS access stratum manager 1112. Upon receiving the request signal 2020, the UMTS access stratum 1112 may create a list of the stored predefined configurations and return the list in a RRC predefined configuration confirm signal 2026 to the access stratum manager 1110. The configuration confirm signal 2026 is reformatted for the GSM access stratum 2028 and routed from the access stratum manager 1110 to the GSM access stratum 1114.

Also illustrated in FIG. 15 is an RRC predefined configuration delete signal 2030 that may be generated by the access stratum manager 1110 to cause the UMTS access stratum to delete 2032 the predefined UMTS configurations from memory.

This written description uses examples to disclose the invention, including the best mode, and also to enable a person skilled in the art to make and use the invention. The patentable scope of the invention may include other examples that occur to those skilled in the art. For example, in other embodiments, the multi-mode mobile communication device may be operable to communicate over and transfer communications between wireless access networks other than the UMTS and GSM access network.

It is claimed:

1. A mobile communication device comprising:
    a first access stratum for communicating with a core network over a first wireless access network;
    a second access stratum for communicating with the core network over a second wireless access network;
    a non-access stratum for controlling communications between the mobile communication device and the core network using a protocol compatible with the core network; and
    an access stratum manager, responsive to a request, to transfer control of a communication link between the non access stratum and the core network from the first access stratum to the second access stratum and to maintain the communication link during the transfer; and
    wherein the access stratum manager interfaces the non-access stratum with the first access stratum and the second access stratum during the transfer, the access stratum manager adapting and routing generic signals received from the non-access stratum for supply to the first access stratum and the second access stratum respectively.

2. The mobile communication device of claim 1, wherein the access stratum manager formats the generic signals received from the non-access stratum based on a currently active one of the first access stratum and the second access stratum, and forwards formatted signals to the currently active access stratum.

3. The mobile communication device of claim 1, wherein the access stratum manager receives from the first access stratum and the second access stratum signals formatted for the associated access network, and converts the formatted signals into re-formatted generic signals for supply of the re-formatted generic signals to the non-access stratum.

4. The mobile communication device of claim 1, wherein one of the first wireless access network or the second wireless access network is a Universal Mobile Telecommunications System.

5. The mobile communication device of claim 1, wherein one of the first wireless access network or the second wireless access network is a Global System for Mobile Communications network.

6. The mobile communication device of claim 1, wherein the non-access stratum interfaces a device application with the core network.

7. The mobile communication device of claim 6, wherein the device application is an internet protocol application.

8. The mobile communication device of claim 7, wherein the internet protocol application is an electronic mail application.

9. The mobile communication device of claim 7, wherein the internet protocol application is a web browser application.

10. The mobile communication device of claim 6, wherein the device application is a telephony application.

11. A method in a mobile communication device, the method comprising:
providing a first access stratum for communicating with a core network over a first wireless access network and a second access stratum for communicating with the core network over a second wireless access network;
controlling communications between the mobile communication device and the core network by means of a non-access stratum network using a protocol compatible with the core network; and
responsive to a request employing an access stratum manager for transferring control of a communication link between the non-access stratum and the core network from the first access stratum to the second access stratum, maintaining the communication link during the transfer; and
wherein the step of transferring comprises the access stratum manager interfacing the non-access stratum with the first access stratum and the second access stratum, the access stratum manager adapting and routing generic signals received from the non-access stratum for supply to the first access stratum and the second access stratum respectively.

12. The method of claim 11, wherein the access stratum manager formats the generic signals received from the non-access stratum based on a currently active one of the first access stratum and the second access stratum, and forwards formatted signals to the currently active access stratum.

13. The method of claim 11, wherein the access stratum manager receives from the first access stratum and the second access stratum signals formatted for the associated access network, and converts the formatted signals into re-formatted generic signals for supply of the re-formatted generic signals to the non-access stratum.

14. The method of claim 11, wherein one of the first wireless access network or the second wireless access network is a Universal Mobile Telecommunications System.

15. The method of claim 11, wherein one of the first wireless access network or the second wireless access network is a Global System for Mobile Communications network.

16. The method of claim 11, comprising interfacing a device application with the core network by means of the non-access stratum.

17. The method of claim 16, wherein the device application is an internet protocol application.

18. The method of claim 17, wherein the internet protocol application is an electronic mail application.

19. The method of claim 17, wherein the internet protocol application is a web browser application.

20. The method of claim 16, wherein the device application is a telephony application.

* * * * *